April 8, 1952  W. E. DIEFENDERFER  2,592,124
PITCH LOCK AND ACTUATING VALVE THEREFOR
Filed May 25, 1950  2 SHEETS—SHEET 1

INVENTOR
William E. Diefenderfer
BY Leonard F. Weklind
AGENT

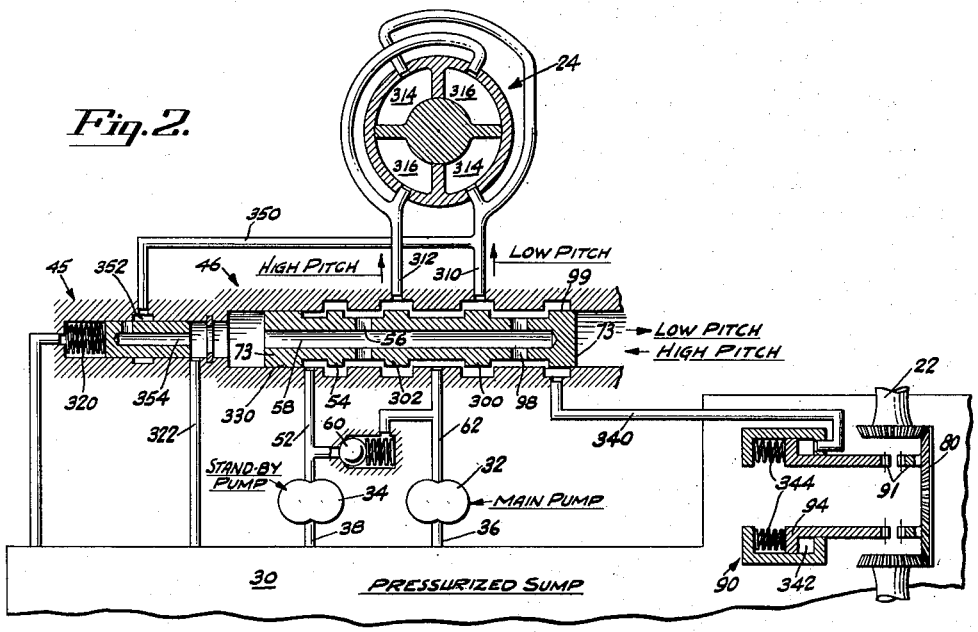
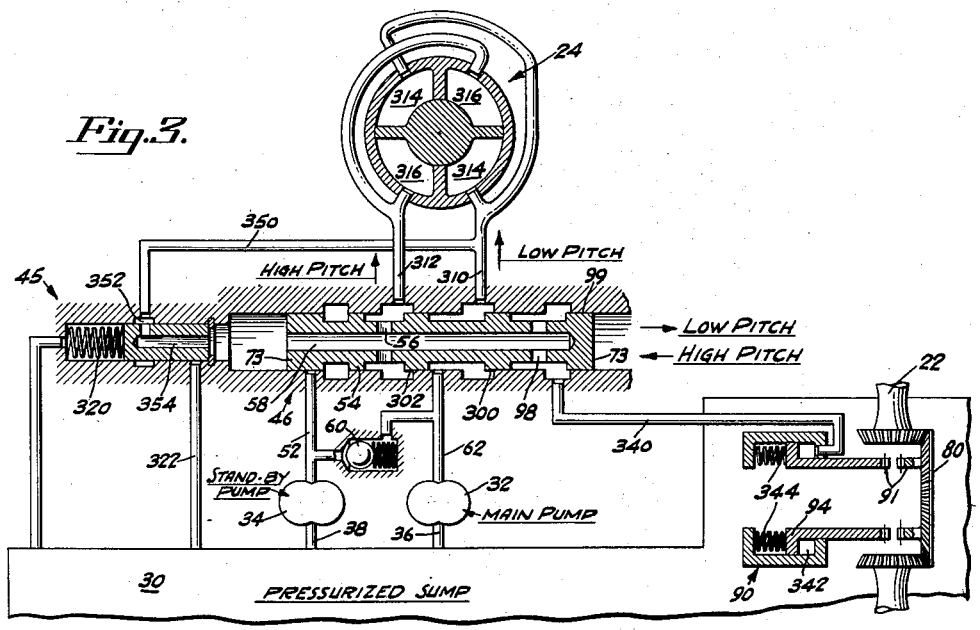

Patented Apr. 8, 1952

2,592,124

UNITED STATES PATENT OFFICE 2,592,124

PITCH LOCK AND ACTUATING VALVE THEREFOR

William E. Diefenderfer, Wethersfield, Conn., assignor to United Aircraft Corporation, East Hartford, Conn., a corporation of Delaware Application May 25, 1950, Serial No. 164,209

7 Claims. (Cl. 170—160.2)

This invention relates to variable pitch propellers and more specifically to improved means for controlling the pitch of such propellers.

It is an object of this invention to provide a fluid operating variable pitch aircraft propeller having an improved pitch controlling mechanism therefor.

A further object of this invention is to provide an improved pitch lock mechanism for variable pitch propeller blades including an improved sequence valve therefor.

These and other objects will become readily apparent from the following detail description of the accompanying drawings in which:

Fig. 2 is a schematic diagram of the pitch change and lock pitch mechanism with the distributor valve substantially in neutral.

Fig. 3 is similar to Fig. 2 with the distributor valve in another position.

Figure 1:
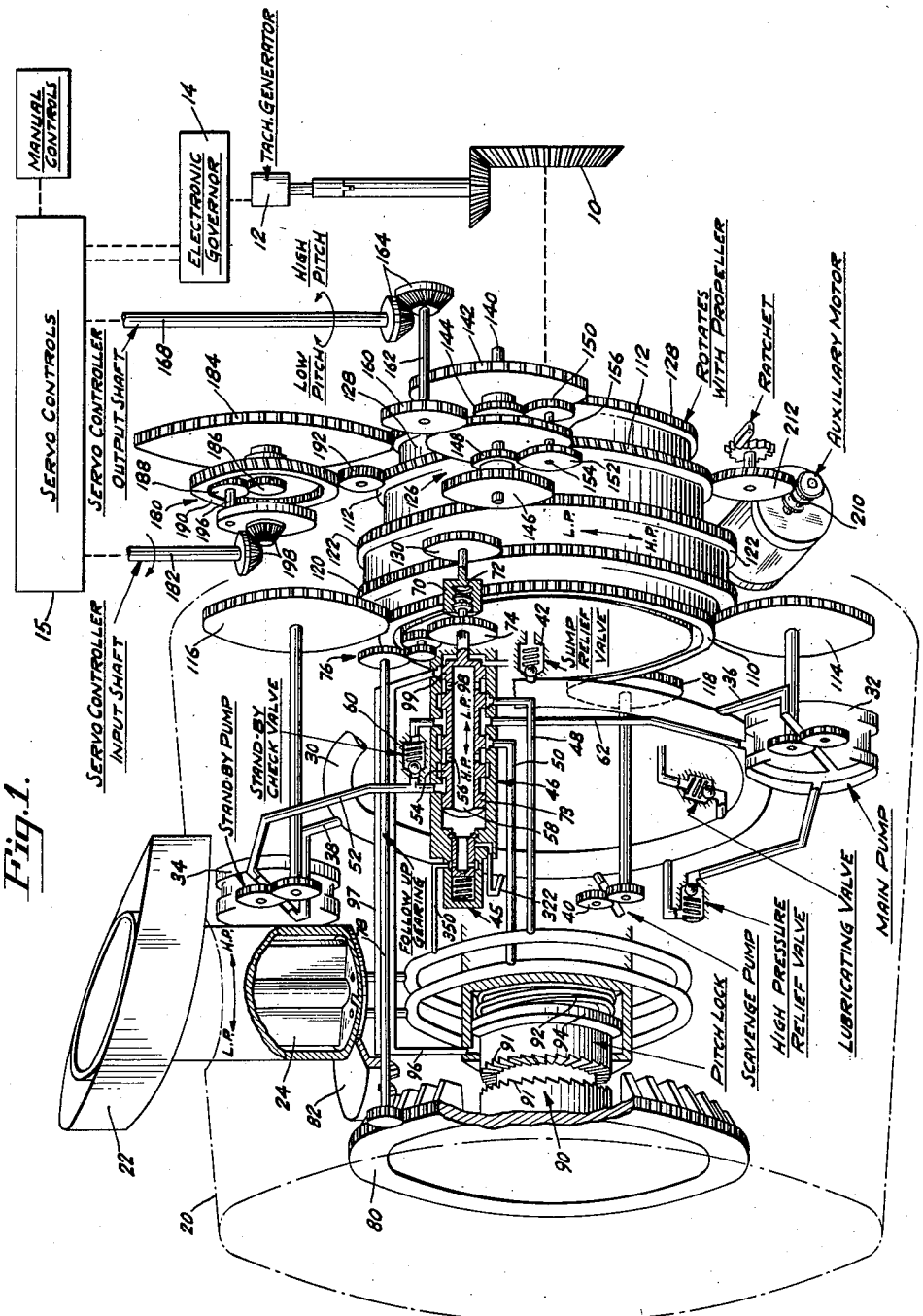
Fig. 1 is a schematic illustration of a propeller and associated gear train for transmitting controlling movements from the control system to the hub carried pitch changing mechanism.

Referring to Fig. 1, a propeller is illustrated as being operatively connected by a driving element or gear 10 which may form a part of a turbine or reciprocating piston power plant and which also serves to drive a tachometer generator 12 which in turn transmits electrical energy to an electronic governor schematically shown at 14. The electronic governor in turn both receives and transmits electrical signals to the propeller control system which includes a servo controller schematically indicated at 15 for convenience.

The propeller illustrated herein comprises a hub 20 which may have a plurality of radially extending variable pitch blades 22 mounted therein with each of the blades having fluid operated vane motors 24 mounted within the shanks thereof. The vane motors 24 respond to high pressure fluid to vary the pitch of the blades in a low pitch or high pitch direction, as indicated by the arrows, it being noted that the letters LP and HP are used in the drawings to indicate said pitch directions respectively.

The propeller hub 20 carries the entire pitch actuating mechanism internally thereof including an integral hydraulic reservoir, the actual construction of which is more clearly illustrated and described in copending application Serial No. 154,857, filed April 8, 1950 by Arthur N. Allen, Jr.

A pressurized sump 30 is provided for supplying fluid to a high pressure main pump 32 and a stand-by pump 34 by means of hydraulic lines 36 and 38, respectively. The sump 30 is pressurized to some nominal value by means of a scavange pump 40 which receives fluid from an oil chamber (not illustrated) under atmospheric pressure. The sump 30 is maintained at this predetermined normal pressure by means of a sump relief valve 42 which dumps relieved fluid back into the above-mentioned chamber which is under atmospheric pressure in a manner illustrated and described in the above-mentioned patent application. High pressure fluid from the pumps 32 and 34 is directed to a distributor valve generally indicated at 46 which controllably directs this high pressure fluid via the lines 48 or 50 to either side of the vane motors 24 for varying the pitch of the blades 22. Since the capacity of the main pump 32 is sufficient for normal pitch changing movements, the output of the stand-by pump 34 is directed from the line 52 around the land 54 of the distributor valve 46 and then to the port 56 of the valve to a central drain passage 58 therein. When the demand for pitch changing movements is high, as reflected by large movements of the distributor valve, the land 54 will close off the incoming fluid from the passage 52 so that the pressure in the passage 42 will immediately build up sufficiently to open the check valve 60 so that an additional volume of fluid will be available for pitch changing movement to supplement the flow of high pressure fluid coming from the main pump 32 via the line 62.

The central portion of the distributor valve 46 is actuated in reciprocating motion by means of a drive nut 70 engaging the worm 72 carried by the central valve portion or spool 73. A follow-up gear 74 is splined to the shaft of the worm 72 so that by means of the gear train 76 and the associated shaft 78 the valve central portion 73 will be repositioned when the blade interconnecting gear 80 is rotated by the gear segments 82 (carried by the blade 22) during pitch changing movements of the blades.

A positive ratchet type pitch lock 90 is provided for automatically locking the blades against pitch changing movements in a low pitch direction in the event of failure of hydraulic pressure in the system. The pitch lock includes a pair of toothed elements 91 which are fixed to the blades and hub respectively. The teeth of these elements 91 are shaped so as to cooperate when engaged to lock against relative movement on one direction (toward blade low pitch) and to ratchet by during movement of the blades toward high pitch. A spring 92 biases a pitch lock piston 94 toward a lock position while fluid under pressure flowing via the line 96 forces the piston 94 toward an unlocked position. A plurality of springs may replace the spring 92 as for example as shown in Fig. 2. The fluid under pressure in the line 96 is fed via a passage 97 which surrounds the follow-up shaft 78 and normally communicates with the central drain chamber of the distributor valve via a port 98, the land 99 adjacent the port 98 normally permitting fluid communication to the pitch lock piston. The drain pressure within the central chamber 58 of the distributor valve is maintained at some predetermined value slightly above the pressure of the sump 30 by means of a pitch lock relief and actuating valve 45 which is shown schematically as being positioned in the end of the distributor valve 46. This valve and accompanying pitch lock mechanism will be described in more detail hereinafter in connection with Figs. 2 and 3.

The pitch lock system shown herein is more fully described and claimed in co-pending patent application Serial No. 129,082, filed November 23, 1949, by Erle Martin and Thomas B. Rhines.

The propeller parts described thus far are contained within, or form a part of, the rotatable hub portion of the propeller assembly and the mechanism hereinafter described is carried in stationary control housing (omitted for convenience) held fixed relative to the associated power plant. To this end, then, a pair of integral gears 110 and 112 are normally fixed so that during propeller rotation the gears 114 and 116 which engage the gear 110 will revolve thereabout and in so doing will provide a rotational drive for the main pump 32 and the stand-by pump 34. The gear 116 may be carried by the hub or else by the stationary housing mentioned above. The scavenge pump 40 contained within the propeller hub will likewise be drivingly rotated through its gear 118 which also engages the normally stationary gear 110. A second pair of integral gears 120 and 122 are, during an on-speed propeller condition, normally rotated at the same speed as the propeller by means of an epicyclic gear train generally indicated at 126 which train is driven by a gear 128 connected for rotation with the propeller and its drive shaft. The gear 120 (which normally rotates at propeller speed) engages a distributor valve driving gear 130 which is fixed to the distributor valve driving nut 70. It is then apparent that during an on-speed condition with the gears 120 and 122 rotating at a speed identical to propeller rotation, the distributor valve drive gear 130 will remain stationary so as not to disturb the setting of the distributor valve 46.

Gears 120 and 122 preferably are mounted immediately adjacent the propeller shaft internally of the normally stationary gear 110 so as to eliminate high relative rotational speeds between gears 120 and 122 and the propeller shaft. This holds true because the gears 110, 112 will be carried remote from the gears 120, 122 by the control housing.

The epicyclic gear train 126 comprises a shaft 140 on which all of the gears thereon are mounted freely. The gears 142 and 144 are connected together for simultaneous rotation, as are also the gears 146 and 148. The gears 144 and 148 may be considered as sun gears and are respectively engaged with the planet gears 150 and 152 which are carried by, and fixed to, a common shaft 154 freely mounted in the gear 156 which forms the planetary cage. A control gear 160 is fixed to a shaft 162 and is driven via the bevel gears 164 by the servo control output shaft 168. During an on-speed condition then, with the servo control output shaft 168 stationary, the control gear 160 will also remain stationary and likewise the planetary cage or gear 156 will also remain stationary. Under these conditions then, with the gear 128 rotating at propeller speed and since it engages the gear 142, a driving train will be provided through the sun gear 144, the planetary pinions 150 and 152, through the gears 148 and 146 and finally to the gears 122 and 120. This driving connection just described in effect then provides a simple step-up, step-down gear train which results in driving the gears 120 and 122 at a speed identical to propeller rotational speed so that no resultant movement of the propeller distributor valve and hence no blade angle change will obtain.

It will then be apparent that in the event the servo control output shaft is rotated to call for an increasing or decreasing pitch change, the bevel gears 164 will rotate the control gear 160 and the planetary cage 156 so that the planetary pinions 150 and 152 will revolve about their respective sun gears 144 and 148 so as to vary the resulting driven speed of the gear 146 and the gears 122 and 120. This variation in speed of the gears 120 and 122 then repersents an increase or decrease, as the case may be, from the rotational speed of the propeller so that relative movement in either direction is obtained between the gear 120 and the distributor valve drive gear 130. As a result, the distributor valve drive nut will cause a subsequent reciprocating movement in the distributor valve so as to vary the pitch of the propeller blades.

A second planetary gear cluster 180 is also provided as an operative connection between the propeller and the servo control input shaft 182. The gear cluster 180 comprises a normally driven gear 184 which engages the gear 128 and, therefore, is driven in timed relation to, and by the rotation of, a propeller. A sun gear 186 is driven by the gear 184 and engages a planetary pinion 188 which in turn meshes with the internal teeth of the ring gear 190. Since the ring gear 190 meshes with the normally fixed gear 112 through a reversing gear 192, it also will be held stationary during normal operation. As a result, the planetary pinion 188 will revolve about the sun gear 186 and thereby through its shaft 196 the bevel gears 198 and the servo control input shaft 182 will be rotated.

As previously described, the normally stationary gears 110 and 112 provide for operation of the hub carried pumps when the propeller is rotating. It is then apparent that some means is necessary to operate these pumps so that high pressure fluid for propeller pitch change is available when the propeller is not rotating, as for example, when it is desired to unfeather the propeller in flight or on the ground. To this end an auxiliary motor is provided with a worm drive 210 for rotating the normally stationary gears 112 and 110 through the interconnecting spiral gear 212. A ratchet mechanism is attached to the interconnecting gear 212 so as to permit rotation of the normally stationary gears 110 and 112 in one direction only, i. e., to prevent inadvertent motion of the normally stationary gears 110 and 112 during normal operation when the reaction of the pumps is imposed thereon.

It is then apparent that during operation of the auxiliary motor the gears 110 and 112 will be rotated so as to provide driving power for the propeller pumps while at the same time providing driving power through the reversing gear 192 to the planetary cluster 180 and the servo control input shaft 182. Hence, under these conditions with the propeller stopped the sun gear 186 of the gear cluster 180 will be held stationary due to the fact that its driving gear 184 and gear 128 are also stationary. With the ring gear 190 now rotating, the plentary pinion 188 will revolve about the sun gear 186 so as to rotate the bevel gears 198 and the input shaft 182. With the input shaft now rotating in the same direction as it does when the propeller is rotating, the servo system then operates to produce the desirable controlling movements in the output shaft 168 to eventually move the distributor valve as desired. The servo control referred to generally herein is described and shown in more detail in application Serial No. 159,736, filed May 3, 1950, by Melvin E. Longfellow.

The particular gear train connections described herein are claimed in co-pending patent application Serial No. 159,772, filed May 3, 1950, by Nelson R. Richmond.

The servo control operates in response to the governor signals and is supplied with power by the input drive shaft 182. The desired pitch variation is then obtained via the movements of the servo output shaft 168 and eventually to the distributor valve 46 as described above. The servo control while responding to signals from the governor 14 is also capable of producing the desired pitch change via the distributor valve 46 in response to the manual controls to provide blade feathering, unfeathering, reverse, unreverse and starting position (substantially zero pitch).

In starting and unfeathering since the propeller is not rotating it is necessary that the auxiliary motor is energized in order to operate the main and stand-by pumps 32 and 34 and subsequently vary the blade pitch. At the same time it is also necessary to provide adequate pressure to unlock the pitch lock mechanism 90 since the drain pressure within the valve 46 will be zero when the propeller is stationary.

In Figs. 2 and 3 the distributor valve 46 is shown in varied positions for different operative conditions. During normal operating conditions of the propeller (Fig. 2), the spool 73 of the distributor valve 46 will be in a neutral position 80 so that the output of the main pump will be delivered to drain as follows.

The main pump 32 takes fluid from the pressurized sump 30 and delivers it at high pressure to the distributor valve 46 wherein the fluid is bled past the land 300 and into the central drain chamber 58 of the spool 73. At the same time fluid under pressure is discharged from the stand-by pump 34 via the line 52 past the land 54 into the central drain chamber 58. It will be noted that the land 54 is comparatively short in axial dimension so that during relatively small movements of the spool 73 high pressure fluid from the stand-by pump will continue to flow into the drain chamber 58. On the other hand, during relatively small movements of the spool 73, the land 300 or the land 302 (depending upon the direction of movement) will cause the fluid from the main pump 32 to flow via the line 62 to either a low pitch line 310 or the high pitch line 312 to the chambers 314 or 316, respectively, of the vane motor 24.

During this normal operation with the spool 73 in the neutral position as shown, or during normal movements of the valve, the sequence or relief valve 45 will be compressed against the spring 320 so as to continuously relieve pressure from the drain chamber 58 via the line 322 back to the pressurized sump 30. The valve 45 maintains the pressure in the drain chamber 58 at some value slightly above that of the pressurized sump 30.

Again during normal operating conditions when the propeller is rotating, in the event that the spool 73 of the distributor valve 46 is moved toward one of its extreme positions and calling for large pitch changes, the land 54 or 330 will close off the flow from the line 52 which is discharging fluid from the stand-by pump 34. To this end then, the check valve 60 will be opened so that the combined flow from both the main pump and the stand-by pump will be directed via the line 62 to either the high pitch line or the low pitch line 312 or 310, respectively, leading to the vane motor 24. Since a predetermined drain pressure is maintained by the relief valve 45, during pitch change the vane motor will be exposed to high pressure on one side and drain pressure on the other side.

In any event, as long as adequate drain pressure is maintained in the drain chamber 58 the land 99 on the spool 73 will permit continued flow via the line 340 to the chamber 342 so as to force the pitch lock piston 94 against the bias of the springs 344 so as to maintain the toothed elements 91 out of engagement. Thus, the toothed elements 91 will be forced into engagement by the springs 344 upon a failure of drain pressure. As schematically shown in Figs. 2 and 3, the pitch lock is continuously exposed on one side to the pressure of sump 30 while its piston 94 is exposed to drain pressure (in chamber 342) on the other side. Thus upon a failure or drop in drain pressure the springs 344 will be aided by the pressure of the sump 30 to move the pitch lock piston 94 into a locked position.

Under conditions when the propeller is not rotating, as for example when the propeller is feathered or in a positive pitch range when the power plant is stopped, there will be no drain pressure existent in the drain chamber 58 of the spool 73 of the distributor valve. Thus, the pitch lock piston 94 will be in the lock engaged position so that some means must be provided to move the piston 94 into a disengaged position should it be desirable to unfeather the propeller or to move the blades toward an engine starting position (zero blade angle). It will be noted that in both these instances a movement toward low pitch is necessary and at this time the servo control (Fig. 1) will immediately call for a low pitch and move the spool 73 of the distributor valve to the full low pitch position as illustrated in Fig. 3. With the propeller stationary the auxiliary motor (Fig. 1) will be energized so as to operate both the main pump 32 and the auxiliary pump 34.

As seen then in Fig. 3, with the spool 73 of the distributor valve in the full low pitch position, the output of both the pumps will be directed, as shown by the arrows, into the low pitch line 310 which leads to the servo motor 24. Hence, until some movement of the vane motor 24 obtains there will be insufficient drain pressure flowing through the line 312 (high pitch line) so as to unlock the pitch lock 90; hence, with the pitch lock engaged, a stalemate occurs. In order to remedy this situation a bleed line 350 is tapped from the low pitch line 310 so as to communicate with a port 352 leading to a drill passage 354 within the valve 45. Under these conditions the valve 45 is held in its extreme right-hand position by the spring 320 since no drain pressure is existent in the chamber 58 tending to force it to the left. Hence, with this arrangement, as soon as the pumps 32 and 34 direct fluid under pressure to the line 310 fluid is bled via the line 350, the port 352 and the passage 354 into the drain chamber 58 and herein the pressure is built up sufficiently so that a pressurized flow occurs through the port 98, the line 340 into the chamber 342 to move the piston 94 of the pitch lock 90 toward an unlock position against its springs 344. As soon as the pitch lock 90 has been unlocked pressure from the pumps 32, 34 will begin moving the blades toward low pitch so that continued drain pressure will be maintained via the line 312 in the drain chamber 58. At the same time the valve 45 will be moved toward the left against the bias of its spring 320 by this drain pressure so as to cover up the port 352 and prevent further flow therethrough into the drain chamber 58. The position of the valve in the last mentioned position is seen in Fig. 2. At the same time the valve 45 will again operate to relieve fluid from the drain chamber 58 into the passage 320. Since pressurized flow is bled to the drain chamber 58 in the manner just described, the vane motor 24 will be exposed to equal pressures on both sides thereof until the pitch lock is unlocked hence there will be no torque on the blades which is forcing the blades against the pitch lock. Hence only after the port 352 is closed by the valve 45 will the pressure in the line 310 exceed that in the line 312.

Thus, it is apparent that the valve 45 operates normally as a relief valve for maintaining a predetermined drain pressure by also acting as a sequence valve when the propeller is non-rotating so as to provide sufficient pressure to unlock the pitch lock mechanism 90 to permit initial blade movements toward a low pitch position.

As a result of this invention it is apparent that a simple yet efficient means has been provided for controlling the pitch of propeller blades particularly where blade movement is desired during unfeathering or other movement toward low pitch and when the propeler is non-rotating.

Although only one embodiment of this invention has been illustrated and described herein, it will be apparent that various changes and modifications may be made in the shape and arrangement of the various parts without departing from the scope of this novel concept.

What it is desired by Letters Patent is:

1. In a propeller blade pitch changing device having a duel direction pitch changing hydraulic motor including high and low pitch sides, a sump, a source of hydraulic fluid under pressure receiving fluid from said sump, a control valve for directing said fluid to said motor from said source and from said motor to said sump including connections to the high pitch and low pitch sides of said motor and passages to said motor and sump, said device having a pitch lock mechanism operatively connected to the blade including a spring urging said lock mechanism into locked position, said lock mechanism being held in unlocked position by preponderance of hydraulic pressure applied to one side therof, a relief valve in the passage from said motor to said sump, a connection between said one side of said pitch lock and the high pressure side of said relief valve, and a valve port opened by said relief valve when it is not relieving pressure but closed by said valve when it is relieving pressure, said port connecting the low pitch side of said motor with said one side of said pitch lock.

2. In an engine driven propeller including a plurality of variable pitch blades, fluid motors for varying the pitch of said blades, a sump, pump means withdrawing fluid from said sump for actuating said motors and normally operable in response to rotation of the propeller, a pitch control valve for controlling the flow of fluid from said pump to said motors including fluid connections to said pump and motors, speed responsive means for positioning said control valve in a plurality of blade pitch positions, said valve directing fluid from said motors while directing fluid to said motors and by-passing fluid from said pump when not directing fluid to said motors to provide a drain path to said sump, a relief valve in said drain path for maintaining the drain pressure at a predetermined value, pitch lock mechanism operative to an unlock position in response to said drain pressure, auxiliary drive means for operating said pump means when the propeller is stationary, and valve means responsive to movement of said control valve toward an extreme blade low pitch position for initially releasing said pitch lock mechanism upon operation of said auxiliary drive means including means for maintaining said lock mechanism released until said motors are actuated and said drain pressure restored.

3. In a propeller pitch changing device having a double acting pitch changing hydraulic motor including high and low pitch sides, a source of hydraulic fluid under pressure operatively connected to said motor for actuating said motor, a control valve for directing fluid to and from said motor, a drain from said motor including a relief valve maintaining the drain fluid at a predetermined value, a pitch lock mechanism held unlocked by said predetermined drain pressure applied to one side thereof, and means for locking said pitch lock when said drain fluid is below said pressure and fluid under pressure is directed to the low pitch side of said motor comprising a port connecting the low pitch side of said motor with the one side of said pitch lock and having connections to the high pitch side of said motor, the connection to the high pitch side of said motor equalizing the force on both sides of said motor until said lock is unlocked, and means for closing said port when said pitch lock is unlocked.

4. In an engine driven propeller including a plurality of variable pitch blades, fluid motors for varying the pitch of said blades including inlet and drain ports therefor, a sump, pump means withdrawing fluid from said sump for actuating said motors and normally operable upon rotation of said propeller, a pitch control valve for selectively operating said motors in pitch increasing and decreasing directions including fluid connections to said motors and sump, speed responsive means for positioning said valve including operative connections thereto, blade pitch lock mechanism operative to an unlock position in response to a preponderance of hydraulic pressure, said preponderance of pressure normally being obtained from said pump means when said control valve is in neutral and from said drain ports when the valve is in a pitch change position, said lock mechanism comprising locking elements for locking said blades against movement toward one pitch direction, auxiliary drive means for energizing said pump means when the propeller is stationary including connections thereto, and means for actuating said pitch lock mechanism in sequence prior to obtaining said drain pressure when the propeller is stationary and said control valve is in a position for pitch change in said one direction comprising a relief valve in the fluid connection from said valve to said sump normally maintaining said drain pressure at a predetermined value sufficient to unlock said lock mechanism, said relief valve including a passage communicating at one end with said inlet and communicating at the other end with said drain port, and resilient means responsive to a build up of a preponderance of said pressure for disabling the communication of said passage with said inlet.

5. In an engine driven propeller including a plurality of variable pitch blades, fluid motors for varying the pitch of said blades, a sump, pump means withdrawing fluid from said sump providing fluid under pressure for actuating said motors, a pitch control valve for controlling the flow of fluid from said pump means to said motors including connections to the high and low pitch sides of said motors, pitch lock mechanism held in an unlock position by a preponderance of hydraulic pressure applied to one side thereof including elements connected to said blades, port means forming a part of said valve providing a return passage to said sump when the valve is not directing a pitch change and closed when the valve is directing a pitch change, a relief valve in said return passage providing said preponderance of hydraulic pressure including means communicating with said pitch lock mechanism, and means providing fluid under pressure in said return passage when said valve is directing a pitch change and upon initially providing fluid under pressure from said pump means comprising a bleed providing communication between one of the sides of said motors and said return passage, and means rendering said bleed inoperative in response operation of said relief valve.

6. In an engine driven propeller including a hub having a plurality of variable pitch blades carried thereby, fluid motors for varying the pitch of said blades including high and low pitch fluid lines therefor, said high pitch line acting as a drain when fluid is directed to said low pitch line, a sump, pump means withdrawing fluid from said sump for actuating said motors and normally energized upon rotation of said propeller, a pitch control valve for selectively operating said motors in high pitch and low pitch directions including fluid connections to said motors and sump, speed responsive means for positioning said valve including operative connections thereto, blade pitch lock mechanism operative to an unlock position in response to a preponderance of hydraulic pressure including elements connected to said blades, said preponderance of pressure normally being obtained from said pump means when said control valve is in neutral and from the drain lines from said motors when the valve is in an extreme pitch change position, said lock mechanism comprising locking elements for locking said blades against movement toward low pitch, auxiliary drive means for energizing said pump means when the propeller is stationary, and means for actuating said pitch lock mechanism in sequence prior to obtaining pressure from said drain lines when the propeller is stationary and said control valve is in an extreme low pitch position comprising, a relief valve normally maintaining the drain pressure at a predetermined value sufficient to supply said preponderance of pressure, said relief valve including a passage communicating at one end with said low pitch lines and at another end with said drain line, and resilient means responsive to a build up to said preponderance of pressure for disabling the communication of said passage with said low pitch lines.

7. In an aircraft propeller having variable pitch blades, fluid motors for varying the pitch of said blades, including expansible and contractible chambers, a sump, pump means withdrawing fluid from said sump for actuating said motors, a pitch control valve for controlling the flow of fluid from said pump means to said motors, said valve having normal and extreme pitch change positions, pitch lock mechanism held in an unlock position by fluid under a predetermined pressure and spring biased toward a lock position, port means including a land forming a part of said valve providing a return passage to said sump from said pump means when the valve is not directing a pitch change and closed when the valve is in an extreme pitch change position, a relief valve in said return passage operable to provide said predetermined fluid pressure, a conduit operatively connecting said pitch lock with said return passage, and means providing fluid under pressure in said return passage when said valve is in an extreme pitch change position comprising a bleed providing communication between the expanding side of said motors and said return passage, and means rendering said bleed inoperative in response to operation of said relief valve.

WILLIAM E. DIEFENDERFER.

REFERENCES CITED

The following references are of record in the file of this patent:

UNITED STATES PATENTS

| Number | Name | Date |
|---|---|---|
| 2,343,416 | Keller | Mar. 7, 1944 |
| 2,413,439 | Drake | Dec. 31, 1946 |

FOREIGN PATENTS

| Number | Country | Date |
|---|---|---|
| 497,999 | Great Britain | Jan. 2, 1939 |